United States Patent
McDaniel et al.

(10) Patent No.: US 11,318,430 B1
(45) Date of Patent: May 3, 2022

(54) CANNABIS PREPARATION MIXER

(71) Applicant: Hanablend, LLC, Chandler, AZ (US)

(72) Inventors: Curtis McDaniel, Chandler, AZ (US); Jack McDaniel, Chandler, AZ (US); Stephen Shelby, Chandler, AZ (US)

(73) Assignee: HANABLEND BOTANICAL APPLIANCES LTD., Calgary (CA)

( * ) Notice: Subject to any disclaimer, the term of this patent is extended or adjusted under 35 U.S.C. 154(b) by 372 days.

(21) Appl. No.: 16/452,113

(22) Filed: Jun. 25, 2019

Related U.S. Application Data (60) Provisional application No. 62/692,315, filed on Jun. 29, 2018.

(51) Int. Cl.
| | | |
|---|---|---|
| *B01F 13/00* | (2006.01) | |
| *B01F 15/00* | (2006.01) | |
| *B01F 13/08* | (2006.01) | |
| *B01F 15/06* | (2006.01) | |
| *B01D 11/02* | (2006.01) | |
| *B01F 13/10* | (2006.01) | |

(52) U.S. Cl.
CPC ...... *B01F 13/0818* (2013.01); *B01D 11/0207* (2013.01); *B01D 11/0211* (2013.01); *B01F 15/00175* (2013.01); *B01F 15/00194* (2013.01); *B01F 15/00266* (2013.01); *B01F 15/00376* (2013.01); *B01F 15/00396* (2013.01); *B01F 15/00409* (2013.01); *B01F 15/065* (2013.01); *B01F 2013/1091* (2013.01); *B01F 2215/0016* (2013.01); *B01F 2215/0032* (2013.01); *B01F 2215/0036* (2013.01); *B01F 2215/0067* (2013.01)

(58) Field of Classification Search
CPC .............. B01F 13/0818; B01F 15/0194; A47J 2043/0733
See application file for complete search history.

(56) References Cited

U.S. PATENT DOCUMENTS

| | | | |
|---|---|---|---|
| 4,209,259 A | 6/1980 | Rains et al. | |
| 5,605,090 A | * 2/1997 | Mantani | ................ A21B 7/005 366/146 |

(Continued)

FOREIGN PATENT DOCUMENTS

| | | |
|---|---|---|
| CN | 105688723 | 6/2016 |
| DE | 4201693 | 4/1993 |
| DE | 102013010203 | 12/2014 |

(Continued)

*Primary Examiner* — Elizabeth Insler
(74) *Attorney, Agent, or Firm* — Booth Udall Fuller, PLC (57) ABSTRACT

A *cannabis* preparation mixer includes a processor, electrically coupled with each of a weighing system, a heating system, a mixing system, and a user interface within a main housing. The processor receives input from the weighing system and the user interface and transmits instructions to the heating system and the mixing system to heat and mix a mixture according to a predetermined pattern selected based upon a weight of herbs sensed at the weighing system. A heating system includes a heat plate that sits on top of a heating element which sits on top of the insulation pad. A mixing system includes a magnetic motor with a magnetic stirrer and wireless temperature probe that rotates above the magnetic motor, the magnetic stirrer having a wireless temperature probe therein. The user interface receives input from a user to identify user preferences and settings.

20 Claims, 11 Drawing Sheets

(56) References Cited

U.S. PATENT DOCUMENTS 6,481,342 B2 * 11/2002 Thackray ................ A47J 43/06
                                                        241/101.01
9,404,789 B2 *  8/2016 Trench Roca ........... H05B 3/74

FOREIGN PATENT DOCUMENTS

| EP | 2802190 | 11/2014 |
|----|---------|---------|
| WO | 2009156020 | 12/2009 |
| WO | 2011080660 | 7/2011 |

* cited by examiner

CANNABIS PREPARATION MIXER

RELATED APPLICATION

This application claims the benefit of U.S. provisional patent application 62/692,315, filed Jun. 29, 2018, titled "*Cannabis* Preparation Mixer," the entirety of the disclosure of which is hereby incorporated herein by this reference.

TECHNICAL FIELD

Aspects of this disclosure relate generally to a chemical preparation mixer and more specifically to a chemical preparation mixer that weighs, heats, and mixes a mixture according to a predetermined recipe to achieve a more reliable and consistent result.

BACKGROUND

The process of creating a chemical mixture often requires multiple measurements, devices, and processes. For example, in order to create oil infused with *cannabis*, the *cannabis* must first go through decarboxylation, a process where the *cannabis* is heated up and held at a specific temperature for a specific amount of time, thus creating tetrahydrocannabinol ("THC") from the naturally occurring tetrahydrocannabinolic acid ("THCA"). This is typically a carefully monitored process performed with the use of an oven.

Once the *cannabis* has gone through decarboxylation, it is then typically smoked as is, or it is infused into an oil or fat. For the infusion to take place, the *cannabis* must be combined with the oil or fat in specific ratios and then stirred while it is heated for a specific amount of time.

The conventional process for creating such *cannabis*-infused oil involves human measurement to get the right mixtures, and requires careful work. In addition, multiple devices are used, such as a scale, measuring cups, an oven, and a crockpot. The typical instruments used, such as an oven, may not have accurate sensors, and the temperature inside may fluctuate significantly. This may alter the amount of THC that is released, making the *cannabis* more or less potent, often resulting in inconsistencies in the potency for two batches seemingly created by the same process and ingredient quantities. A user that desires to make *cannabis*-infused oil therefore must deal with a significant amount of uncertainty with respect to the potency of the end product. In addition, different preferences may require different actions from the user. For example, *cannabis* contains a variety of chemicals that a user may want to draw out, such as THC, cannabidiol ("CBD"), terpenes, and cannabinol ("CBN"). Different temperatures and cook times will draw out more or less of each of these chemicals. Conventional methods of preparing *cannabis* require that the user know each different recipe and implement the temperatures and cook times carefully depending upon the particular potency of the *cannabis* used, and the actual temperature and cook times.

SUMMARY

According to an aspect of the disclosure, a *cannabis* preparation mixer may comprise a processor, electrically coupled with each of a weighing system, a heating system, a mixing system, and a user interface, the processor configured to receive input data from at least the weighing system and the user interface and transmit operational instructions to the heating system and the mixing system to heat and mix a mixture according to a predetermined pattern selected based upon a weight of herbs sensed at the weighing system, wherein the weighing system is coupled to and exposed on a main housing, the weighing system comprising a scale plate and a scale sensor, wherein the scale plate sits on top of the scale sensor and provides a weighing surface which is substantially horizontal, wherein the heating system is coupled to and exposed on the main housing and comprises a heating element, a heat plate, and an insulation pad, wherein the heat plate sits on top of the heating element which sits on top of the insulation pad, the heat plate providing a heating surface which is substantially horizontal, wherein the mixing system comprises a magnetic motor configured to magnetically couple a magnetic stirrer with a magnetic driver to cause the magnetic stirrer to rotate above the driver, the magnetic stirrer having a wireless temperature probe therein, and wherein the user interface is configured to communicatively couple with the processor and configured to receive input from a user to identify user preferences and settings.

Particular embodiments may comprise one or more of the following features. The weighing system may be exposed on a top surface of the main housing. The magnetic driver may be a coil array with the magnetic stirrer positioned above the coil array and formed as a disk comprising a plurality of positively charged and negatively charged features alternately spaced around a center of the disk, the positively charged and negatively charged features magnetically responsive to the coil array to cause the magnetic stirrer to rotate. The magnetic stirrer may be formed as a central hub with at least two arms that extend out radially from the central hub. At least a portion of each of the weighing system, heating system, mixing system, and user interface are contained within the main housing.

According to an aspect of the disclosure, a chemical preparation mixer may comprise a processor, electrically coupled with each of a weighing system, a heating system, a mixing system, and a user interface, the processor configured to receive input data from at least the weighing system and the user interface and transmit operational instructions to the heating system and the mixing system to heat and mix a mixture according to a predetermined pattern selected by a user, wherein the weighing system is coupled to and exposed on a main housing, the weighing system comprising a scale plate and a scale sensor, wherein the scale plate sits on top of the scale sensor, wherein the heating system is coupled to and exposed on the main housing and comprises a heating element and a heat plate, wherein the heat plate sits on top of the heating element, the heat plate providing a heating surface which is substantially horizontal, wherein the mixing system comprises a driver configured to magnetically couple with a magnetic stirrer to cause the magnetic stirrer to rotate above the driver, the magnetic stirrer having a wireless temperature probe, wherein the user interface is configured to communicatively couple with the processor and configured to receive input from the user to identify user preferences and settings, and wherein at least a portion of each of the weighing system, heating system, mixing system, and user interface are contained within the main housing.

Particular embodiments may comprise one or more of the following features. The driver may a magnetic coil array with the magnetic stirrer positioned above the coil array and formed as a disk comprising a plurality of positively charged and negatively charged features alternately spaced around a center of the disk, the positively charged and negatively charged features magnetically responsive to the coil array to cause the magnetic stirrer to rotate. The magnetic stirrer may be formed as a central hub with at least two arms that extend out radially from the central hub. The predetermined pattern may be selected based upon a weight of herbs sensed at the weighing system. The weighing system may be adjacent to the heating system. The scale plate may be formed as a bowl. The mixing system may further comprise a magnet holder coupled to the driver and to at least one magnet.

According to an aspect of the disclosure, a chemical preparation mixer may comprise a processor, electrically coupled with each of a weighing system, a heating system, a mixing system, and a user interface, the processor configured to receive input data from at least the weighing system and transmit operational instructions to the heating system and the mixing system to heat and mix a mixture, wherein the weighing system is coupled to and exposed on a main housing, the weighing system comprising a scale plate and a scale sensor, wherein the scale plate sits on top of the scale sensor, wherein the heating system is coupled to and exposed on the main housing and comprises a heating element, wherein the heating element provides a heating surface which is substantially horizontal, wherein the mixing system comprises a driver configured to couple with a stirrer to cause the stirrer to rotate, and wherein the user interface is configured to communicatively couple with the processor and configured to receive input from a user to identify user preferences and settings.

Particular embodiments may comprise one or more of the following features. The driver may further comprise a coil array and the chemical preparation mixer further comprising the stirrer magnetically coupled to the coil array. The stirrer may be formed as a central hub with at least two arms that extend out radially from the central hub. The stirrer may comprise a ring encircling the stirrer and an end of each of the arms is integral with the ring. The processor may be configured to send instructions to the mixer according to a predetermined pattern selected based upon a weight of herbs sensed at the weighing system. The scale plate may be formed as a bowl. The stirrer may comprise a temperature probe therein, wirelessly coupled to the processor. The driver may be configured as a magnetic coil array with the stirrer, as a magnetic stirrer, positioned above the coil array and formed as a disk comprising a plurality of positively charged and negatively charged features alternately spaced around a center of the disk, the positively charged and negatively charged features magnetically responsive to changes in polarity of the coil array to cause the magnetic stirrer to rotate.

BRIEF DESCRIPTION OF THE DRAWINGS

Implementations will hereinafter be described in conjunction with the appended drawings (which are not necessarily to scale), where like designations denote like elements, and.

DETAILED DESCRIPTION

This disclosure, its aspects and implementations, are not limited to the specific components, examples, or configurations disclosed herein. Many additional components, examples, and configurations known in the art consistent with the intended operation for a chemical preparation mixer will become apparent for use with particular implementations from this disclosure. Accordingly, for example, although particular implementations are disclosed, such implementations and implementing components may comprise any shape, size, style, type, model, version, measurement, concentration, materials, quantity, and/or the like as is known in the art for such systems and implementing components, consistent with the intended operation of a chemical preparation mixer.

Figure 1:
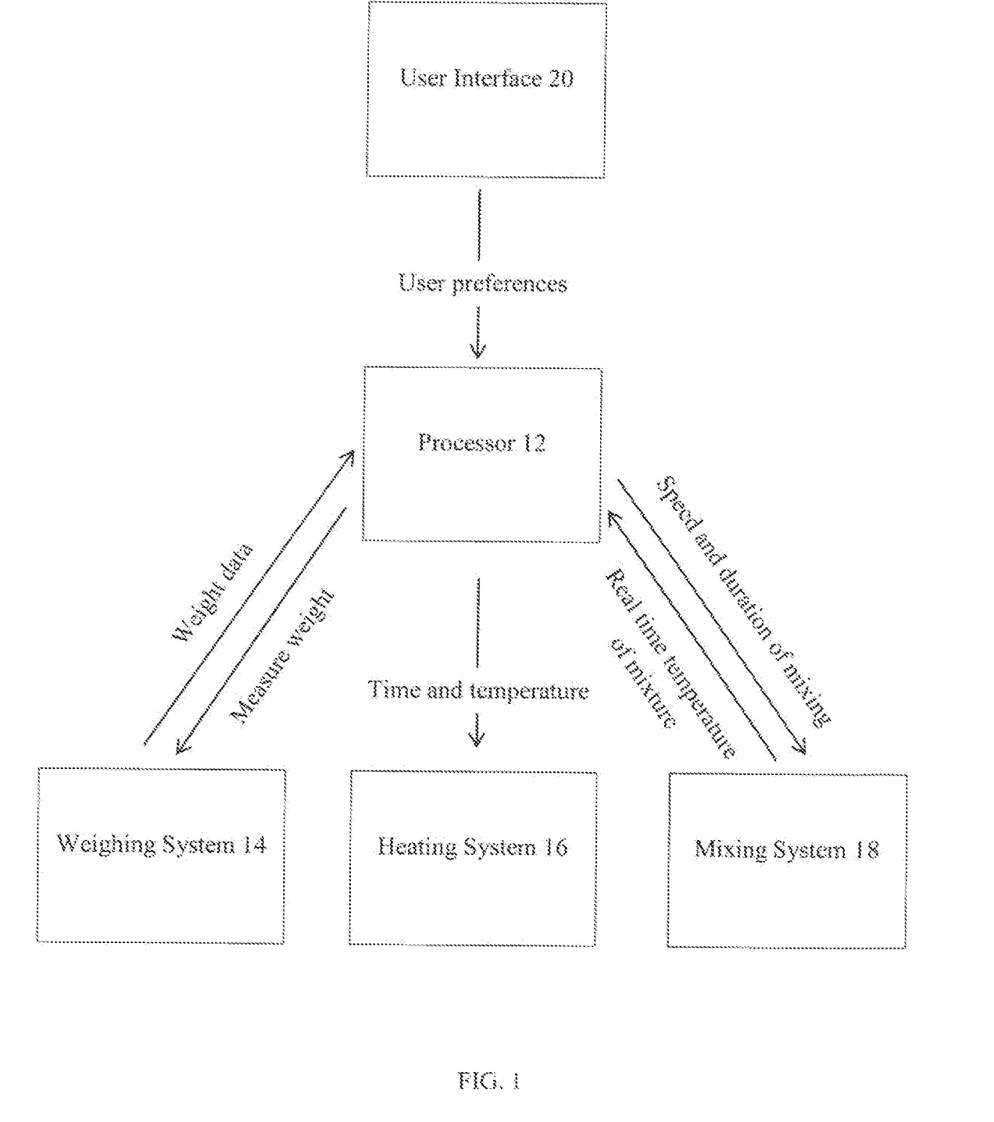
FIG. 1 is a block diagram illustrating the interaction between the processor and the weighing, heating, and mixing systems of a chemical preparation mixer.

This disclosure concerns a chemical preparation mixer 10 which has a processor 12 and may have a weighing system 14, a heating system 16, a mixing system 18, and/or a user interface 20. FIG. 1 illustrates the interaction of these various systems, which are communicatively coupled to allow data to be communicated between them. This communication may be electrical, wireless, or any other form of communication.

The user interface 20 allows a user to input preferences and settings into the chemical preparation mixer 10. For example, if the user were preparing oil infused with THC or CBD, the user would have the opportunity to enter the amount of oil used and the levels of THC or CBD present in the *cannabis*, as well as the characteristics of the desired end product, before beginning the process. The user interface 20 reports this information to the processor 12, which connects all of the different systems and enables them to work together. For example, in some embodiments, once the processor 12 receives the input data from the user interface 20, it may send an instruction to the weighing system 14 to measure the weight of the chemicals being used. The weighing system 14 may then measure the weight and the processor 12 then receives information back from the weighing system 14 indicating the weight of the chemicals being used. The processor 12 may then use the input data and the weight of the chemicals to determine the speed and duration of mixing and the temperature of the mixture necessary to produce the desired end result according to predetermined patterns stored in association with the processor 12, such as different combinations of mixing speeds, time, and temperatures. Persons of skill in the art will understand what combinations of mixing speed, time, and temperature will produce different desired results depending on the. The pattern may also be selected based on the type of chemical used, the desired end result, and the behavior of the selected chemical when subjected to mixing and heating as known in the art. The processor 12 may instruct the mixing system 18 to mix for the determined amount of time and at the determined speed. In addition, the processor 12 may instruct the heating system 16 to heat the chemicals to the determined temperature. The temperature of the mixture may be monitored by a temperature probe 22 which is in communication with the processor 12. The temperature probe 22 may take real time measurements and report these to the processor 12. In response to these temperature measurements, the processor 12 may adjust the heating system 18 to either raise or lower the temperature.

Figure 2:
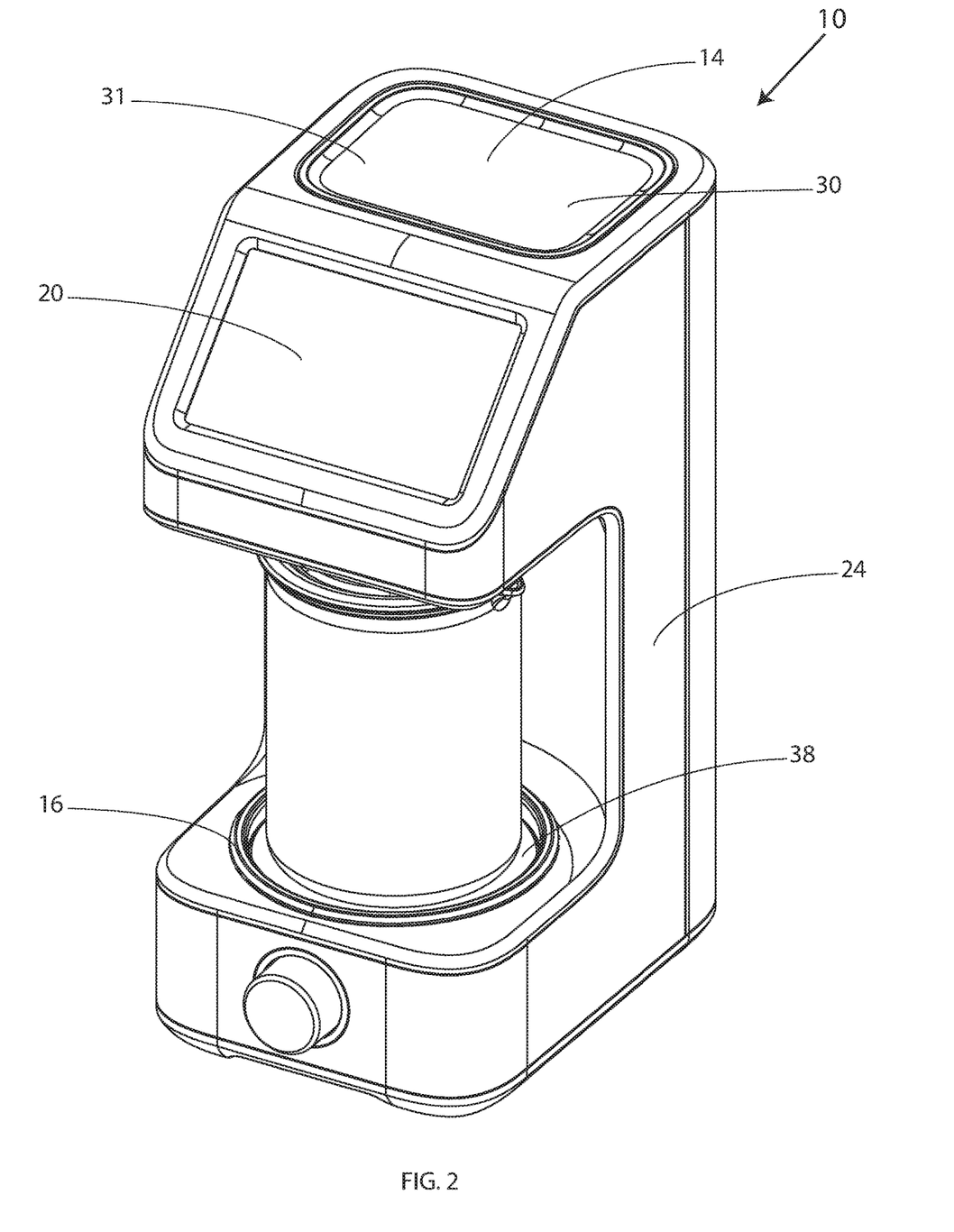
FIG. 2 a perspective view of a physical embodiment of the chemical preparation mixer of FIG. 1.
Figure 3:
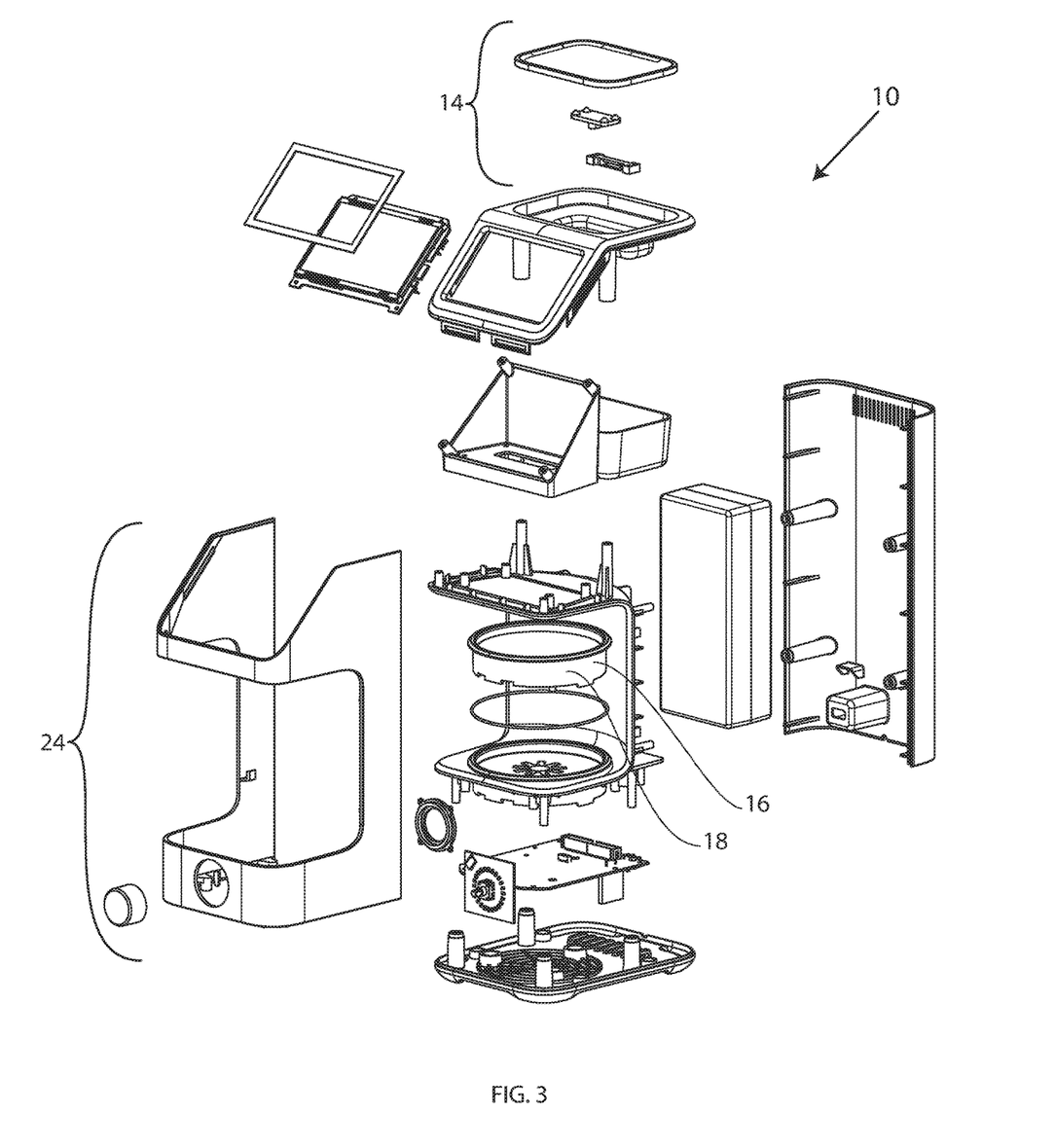
FIG. 3 is an exploded view of the chemical preparation mixer of FIG. 2 with the various systems labeled.

FIGS. 2 and 3 illustrate a non-limiting embodiment of a chemical preparation mixer 10 having a processor 12, a weighing system 14, a heating system 16, a mixing system 18, a user interface 20, and a main housing 24. The main housing 24 may contain at least a portion of each of the processor 12, weighing system 14, heating system 16, mixing system 18, and user interface 20. (See also FIG. 7). Each of the weighing system 14, heating system 16, mixing system 18, and user interface 20 may be partially exposed to allow each to serve its function. For example, in some embodiments, the weighing system 14 is exposed so that chemicals may be placed on the exposed portion, allowing the chemicals to be weighed, and the heating system 16 is exposed to provide a surface which can heat the mixture directly.

Figure 4:
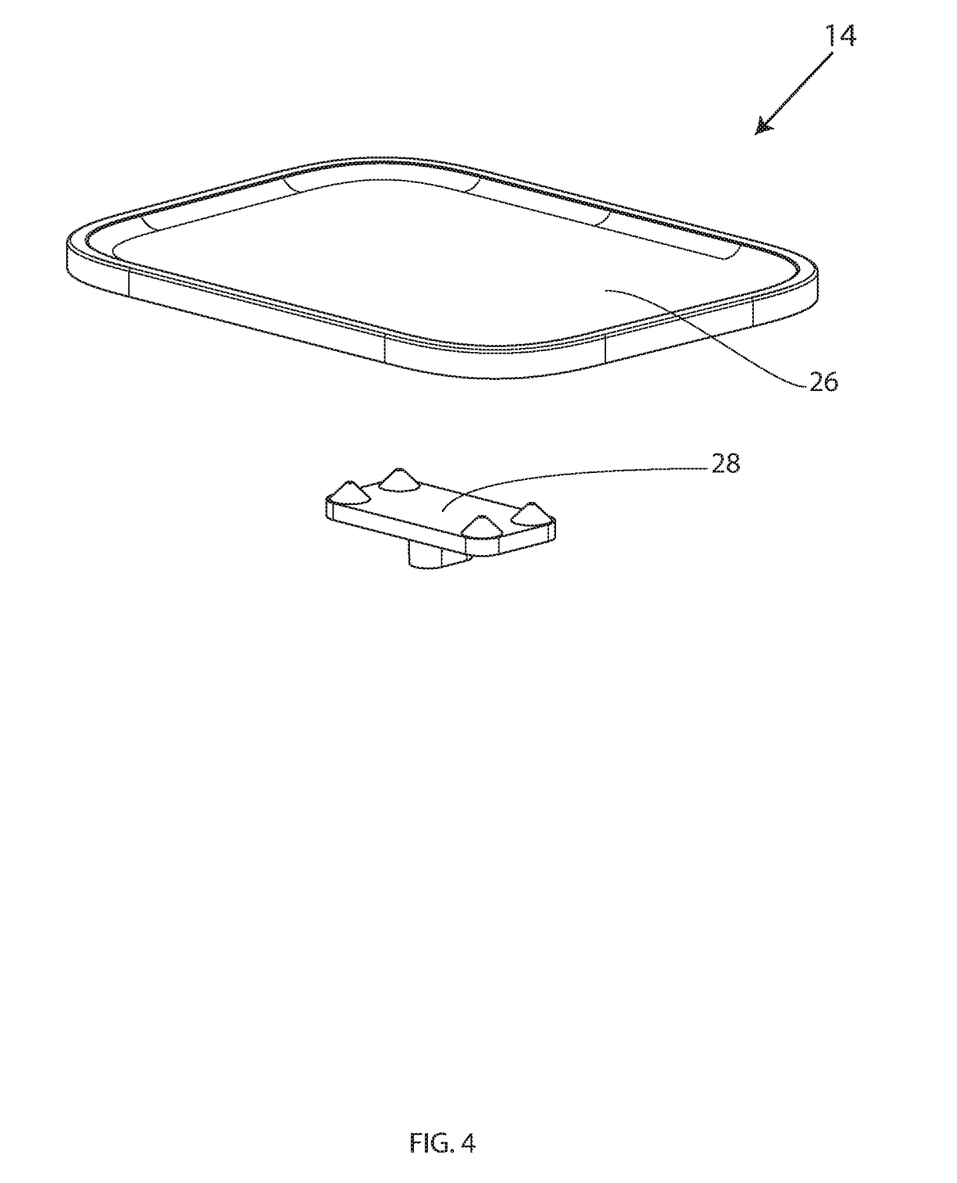
FIG. 4 is an exploded view of the weighing system shown in FIG. 3.
Figure 11:
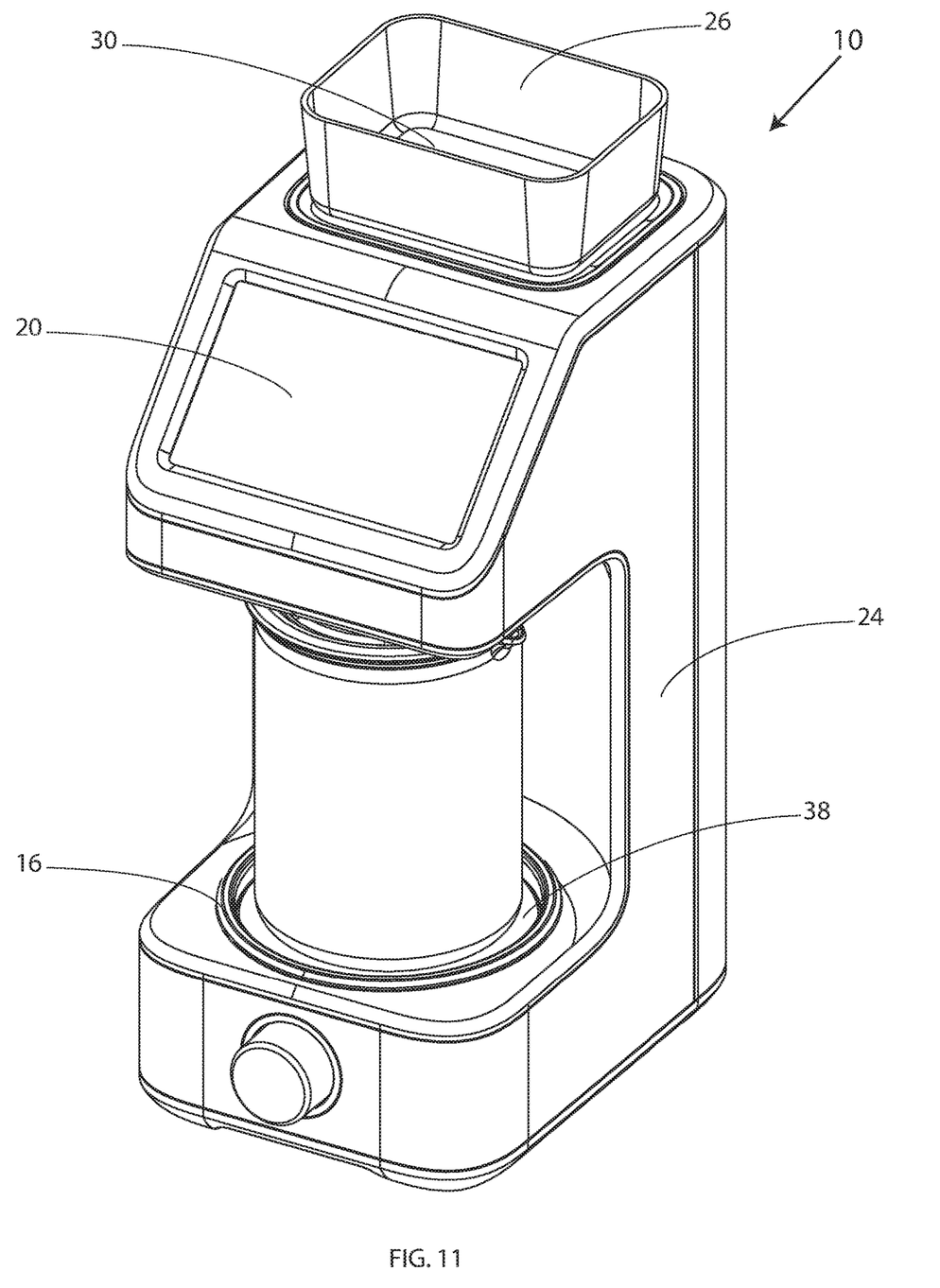
FIG. 11 is a perspective view of the weighing system where the scale plate is a bowl.
Figure 12A:
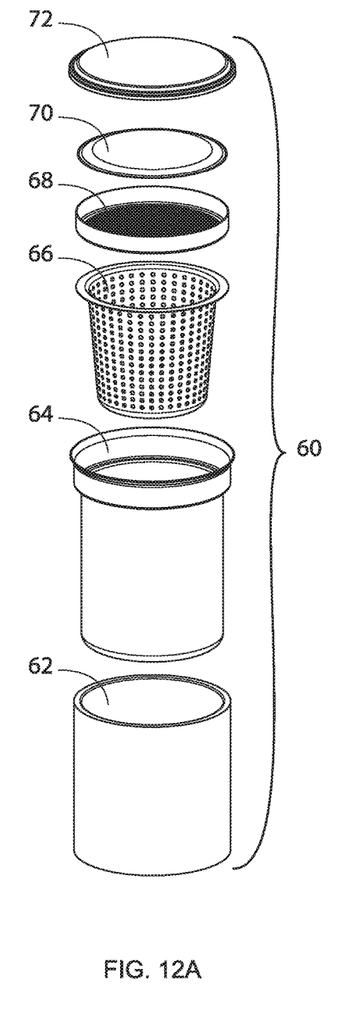
FIGS. 12A-12E are views of a dry roast canister.
Figure 12B:
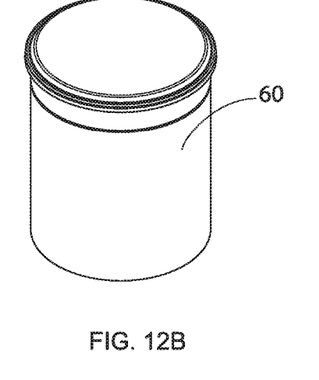
Figure 12C:
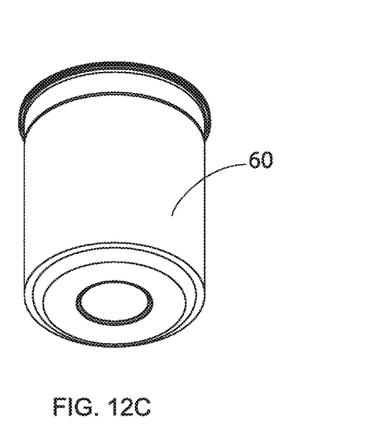
Figure 12D:
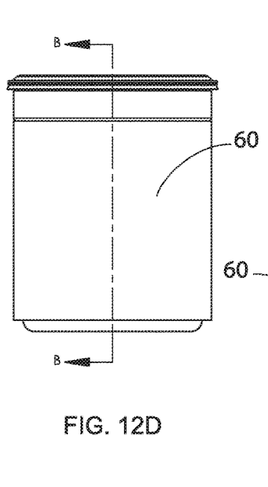
Figure 12E:
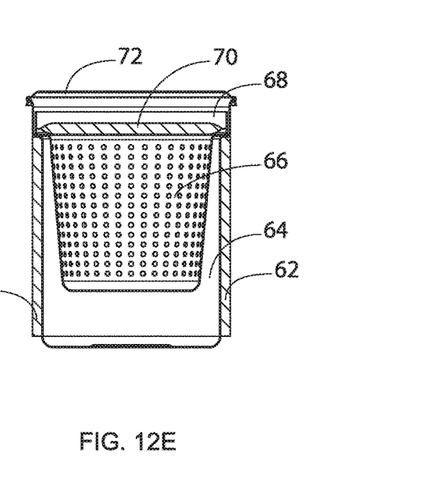

FIG. 4 illustrates a weighing system 14 of the chemical preparation mixer 10 having a scale plate 26 and a scale sensor 28. The scale plate 26 may comprise a weighing surface 30 on which to place the chemicals that are being weighed. In particular non-limiting embodiments, the weighing surface 30 is substantially horizontal, where substantially horizontal includes any angle within ten degrees of perfectly horizontal or zero degrees. In some non-limiting embodiments, the scale plate 26 is formed as a bowl, allowing the weighing system 14 to contain and weigh a larger portion of a chemical. (See FIG. 11). The scale sensor 28 may be any sensor capable of measuring the weight of an object. For example, the scale sensor 28 may comprise a load cell that functions pneumatically or with strain gauges, for example with four strain gauges positioned near the corners of the load cell. In particular implementations, the scale plate 26 sits on top of and is in contact with the scale sensor 28 to allow the scale sensor 28 to measure the weight changes as chemicals are placed on and removed from the weighing surface 30 on the scale plate 26. The scale sensor 28 may be communicatively coupled to the processor 12 to report the weight of chemicals placed on the weighing surface 30. This recorded weight can then be used in determining the temperature, length of time, and mixing speed for producing the user's desired mixture. In some embodiments, the weighing surface 30 is the top surface 31 of the chemical preparation mixer 10.

Figure 5:
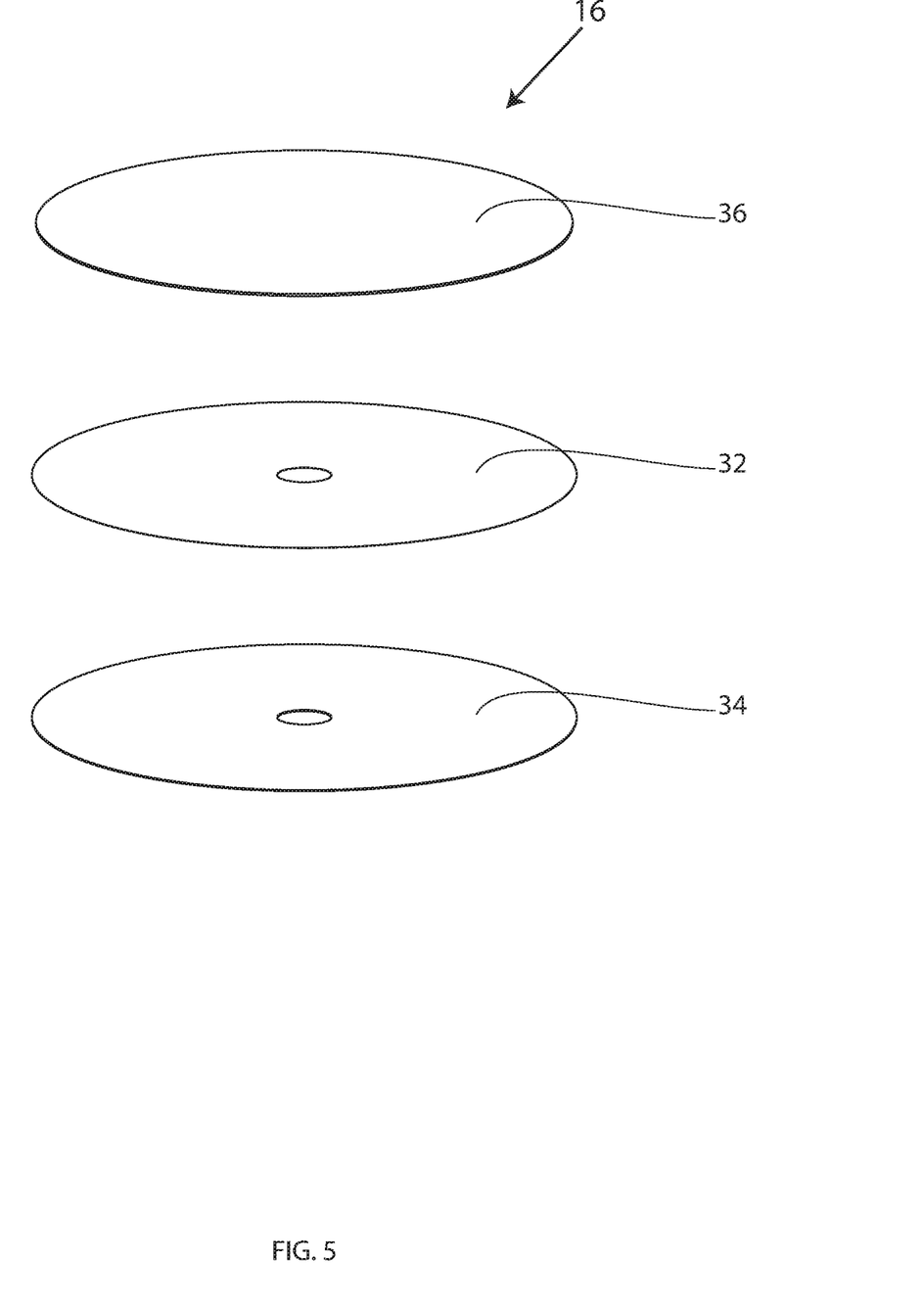
FIG. 5 is an exploded view of the heating system shown in FIG. 3.

FIG. 5 illustrates a heating system 16 of the chemical preparation mixer 10. The heating system 16 may include a heating element 32 and various insulation pads 34. The heating element 32 may be made of any material and in any shape which is suitable for the purposes of the heating element 32. For example, the heating element 32 may be made with a conductive material which heats up when electrical current is supplied. The heating element 32 may be a flat plate, as illustrated. Alternatively, the heating element 32 may be a wire, coil, or some other shape. The heating system 16 may also include a heat plate 36 which may help distribute the heat supplied by the heating element 32. The heating element 32 or the heat plate 36 may provide a heating surface 38. In particular non-limiting embodiments, the heating surface 38 is substantially horizontal, where substantially horizontal includes any angle within ten degrees of perfectly horizontal or zero degrees. In some embodiments, the components of the heating system 16 are arranged with the heat plate 36 sitting on top of the heating element 32 and the heating element 32 sitting on top of an insulation pad 34. This allows the heating element 32 to supply the necessary heat to the heat plate 36 without damaging other components of the chemical preparation mixer 10. In embodiments without a heat plate 36, the heating element may be exposed through the main housing 24 and may sit on top of an insulation pad 34.

Figure 6A:
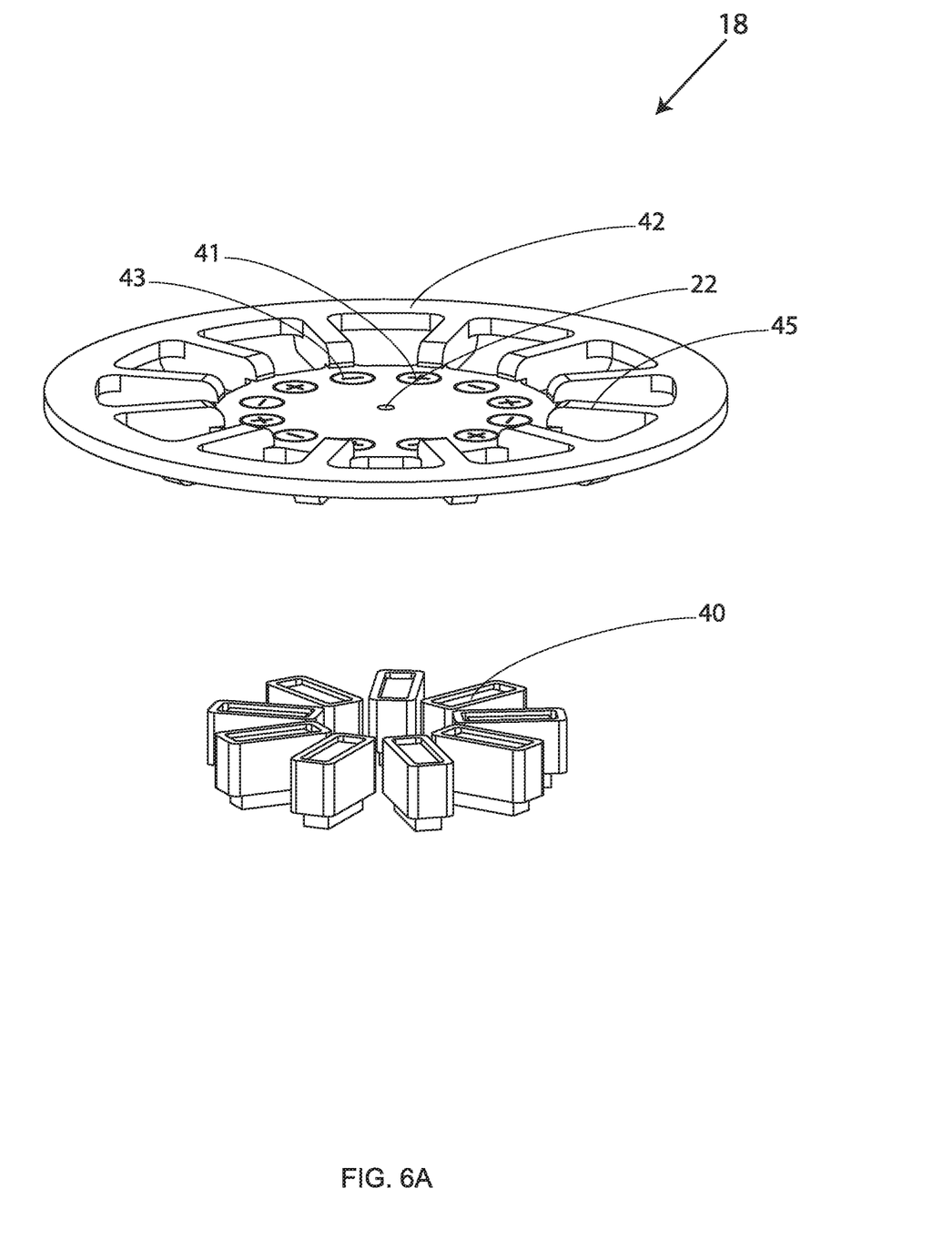
FIG. 6A is an exploded view of the mixing system shown in FIG. 3.
Figure 6B:
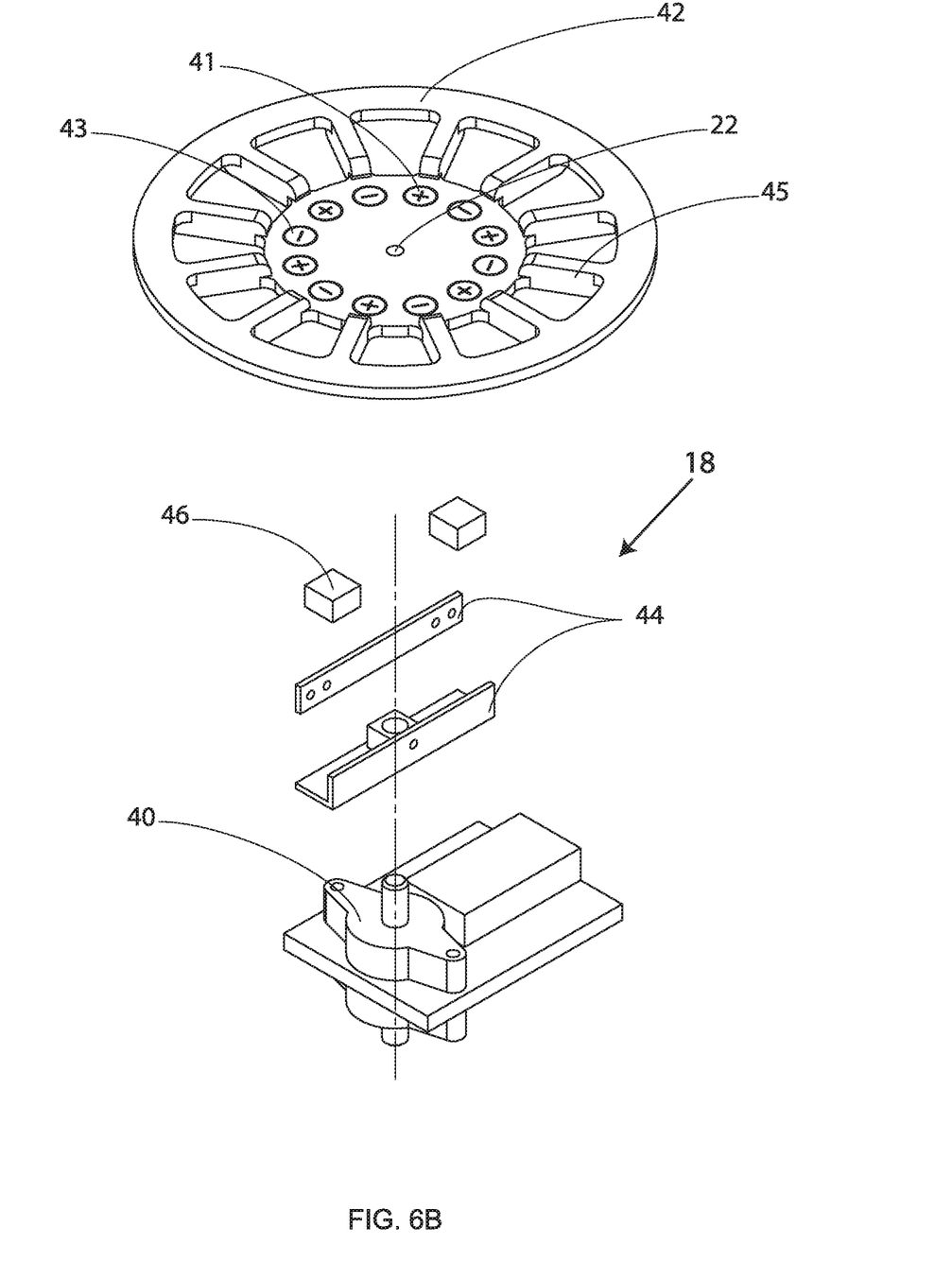
FIG. 6B is an exploded view of another embodiment of the mixing system.

FIGS. 6A-6B illustrate a mixing system 18 of the chemical preparation mixer 10. The mixing system 18 may include a motor comprising a driver 40 and a stirrer 42. The stirrer 42 is coupled to the driver 40 and inserted into the mixture. The stirrer 42 may contain a temperature probe 22 or have the temperature probe 22 attached, allowing the temperature probe 22 to take temperature measurements of the mixture as the stirrer 42 stirs the mixture. The stirrer 42 may be of any configuration known in the art for stirrers, or in particular embodiments may be uniquely formed as a disk stirrer 42, such as that illustrated in FIGS. 6A and 6B. A disk stirrer 42 shown in FIGS. 6A and 6B comprises a plurality of intermittently spaced positively charged (+) 41 and negatively charged (−) 43 components that are magnetically responsive to changes in polarity of the driver 40, which is formed as a coil array 40, such that as the magnetic field emitted from the coil array 40 alternates around the coil array 40, the disk stirrer 42 above the coil array 40 reacts and spins. Stirring blades 45 on the disk stirrer 42, that extend through the disk stirrer 42, help to agitate a mixture or other fluid surrounding the stirrer above the coil array 40.

The coupling between the driver 40 and the stirrer 42, whatever form of stirrer 42 is used, may be mechanical, magnetic, or any other appropriate coupling. In particular embodiments in which the stirrer 42 is magnetically coupled to the driver 40, including the embodiment in FIG. 6A, the driver 40, when configured as a coil array, may be a magnetic coil array comprising a series of electrically conductive metal coils arranged in a circle. To operate this embodiment of the driver 40, the processor 12 provides power to each metal coil for a brief moment, and then provides power to the adjacent metal coil, moving around the circle. When power is provided to a metal coil, this generates a magnetic field, creating the magnetic coupling between the driver 40 and the stirrer 42. As the magnetic field generated by the coils moves around the circle, the stirrer 42 follows, thus rotating in a circle and stirring the mixture.

The combination of the stirrer 42 and the driver 40 forms a brushless direct current (DC) motor. The shape of the stirring blades 45 on the disk stirrer 42, that extend through the stirrer 42 with apertures on either side of the stirring blades 45, provide enhanced stirring force from the disk stirrer 42 to the fluid within a container into which the stirrer 42 is placed. In particular embodiments, the disk stirrer 42 may also include a bevel or raised spin point at a center of the stirrer 42 on the bottom surface to create a spin axis, much like a toy spinning top, and minimize the contact between the stirrer 42 and the container into which the stirrer 42 is placed while the stirrer 42 is rotating. In embodiments where the raised spin point is used, the stirrer 42, when being driven by a magnetic driver 40, will spin and minimization of friction with the surroundings other than the fluid is advantageous. The shape of the blades 45, which extend above a center portion of the disk and below an outer ring of the disk, assists in enhancing the stirring capability of the stirrer 42 when configured as a disk.

In another embodiment illustrated in FIG. 6B, the driver 40 may be coupled to a magnet holder 44. The magnet holder is coupled to at least one magnet 46. Thus, when the processor 12 supplies power to the driver 40, the driver 40 rotates the magnet holder 44, moving the magnet 46 in a circular path. With the stirrer 42 magnetically coupled to the magnet 46, the stirrer 42 also rotates, stirring the mixture.

In some embodiments, any of the weighing system 14, heating system 16, and mixing system 18 may be integrated into one assembly. For example, the heating system 16 and the mixing system 18 may be designed to be a combined assembly that can be removed as a single unit. In such an embodiment, the components of each of the heating system 16 and the mixing system 18 may be mixed, rather than be kept separate.

The processor 12 connects all of the different systems and enables them to work together, in addition to calculating and controlling start and end times, motor speeds, and precise cooking temperatures based on the components of the system discussed previously. For example, a user may select a pre-programmed recipe and enter the amount of oil used through the user interface 20. In particular implementations where the chemical is *cannabis*, this information is then used by the processor 12 to weigh the *cannabis*, determine the length of time and temperature at which to heat the heating element 32 to cause the *cannabis* to go through decarboxylation, and thus get the desired composition of each of the chemicals. The processor 12 then coordinates the heating element 32, the driver 40, the temperature probe 22, and the scale sensor 28 to implement a cook time, mixing speed, and cook temperature to produce the *cannabis*-infused oil desired. With the temperature probe 22 giving real-time feedback on the temperature of the mixture, the processor 12 can increase or decrease the flow of heat to the heating element 32 to keep the mixture at a precise temperature. The processor 12 also allows the user to get the desired end result without requiring that the user calculate temperatures or cook times. This may limit the variation in potency that is conventionally introduced through human error and separate, disconnected sensors and processes.

By way of particular example, a desired end result in a particular instance may be a *cannabis*-infused butter of a calculated potency, such as 4 milligrams of THC per milliliter of butter. In such a case, the starting ingredients are butter and *cannabis*. First, the user places the *cannabis* in a decarboxylation canister 60 (FIGS. 2 and 11-12E) and places the canister on the heat plate 36. The user then selects the decarboxylation process using the user interface 20. The processor 12 supplies power to the heating element 32 and leaves it running for the device-defined duration based on the default or user-specified temperature. Once the *cannabis* has finished with decarboxylation, it may be set aside. Next, the user adds an amount of butter into a beaker, such as a 100 milliliter beaker, and then enters this value into the user interface 20. The processor 12 then asks for the known value of THC for the particular strain of *cannabis* being used, which may be 20% in this case, and the user enters this value into the user interface 20. The *cannabis* is then slowly added to the scale plate 26. As this occurs, the user interface 20 provides the user with the maximum THC concentration of the final solution in real time based on the weight of *cannabis* on the scale. Once the desired potency is reached, the user stops putting *cannabis* onto the scale sensor 26. In this case, this would occur with 2 grams of *cannabis*, which contains 400 milligrams of THC. The user then adds the measured *cannabis* into the beaker containing the butter and the stirrer 42, which is on the heat plate 36. The user then enters the desired potency of 4 milligrams of THC per milliliter of butter and hits begin. The chemical preparation mixer 10 then calculates the amount of time, temperature, and mixing speed needed to make butter with the desired potency, and implements those calculations through control signals sent to the various attached components to make the desired end product. Other percentages and chemicals may also be implemented, and those of ordinary skill in the art will understand how to calculate the time, heat, and mixing speed needed for each type of chemical and desired percent composition. The potency of the final mixture may be calculated automatically by the processor 12.

Figure 7:
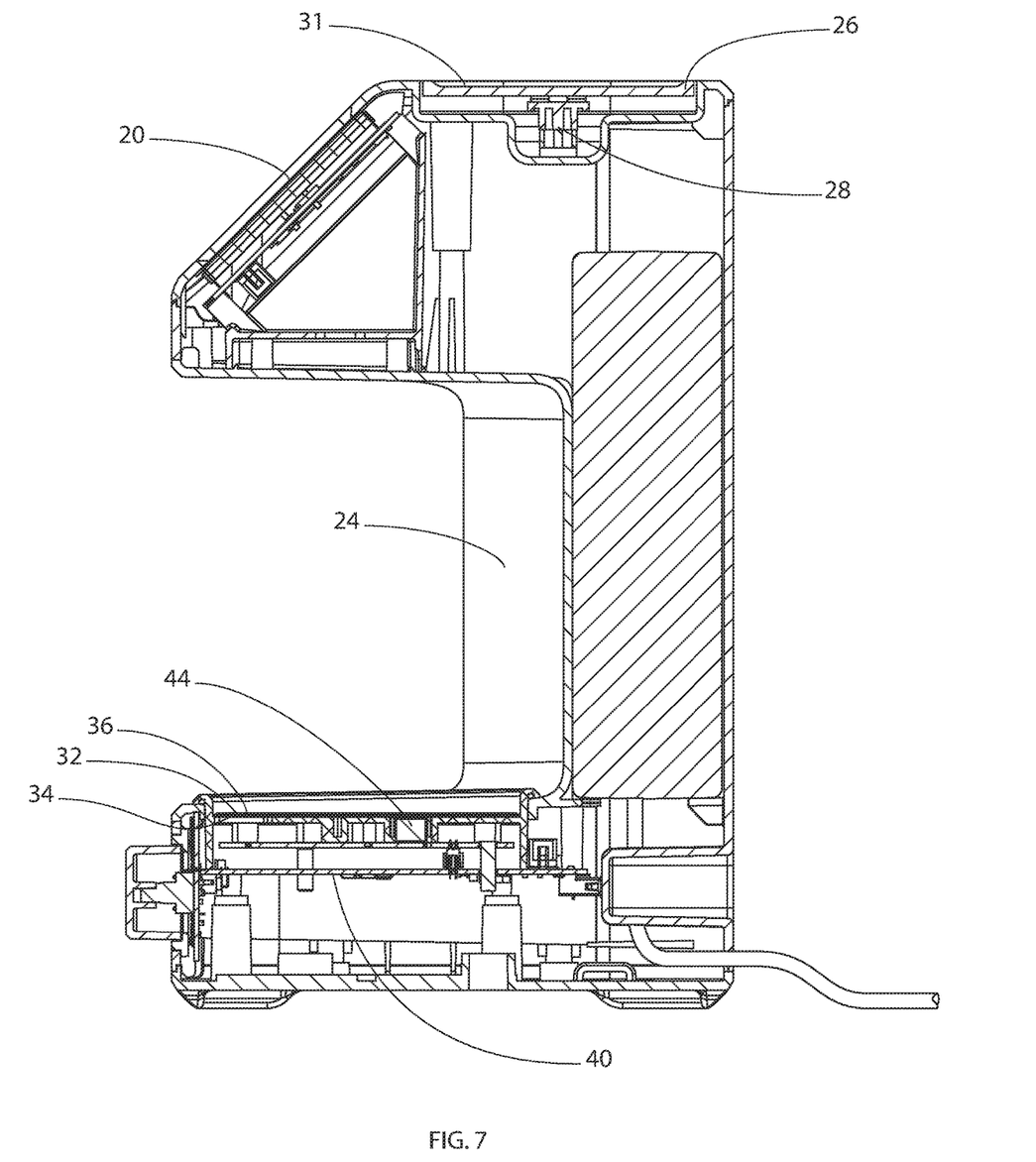
FIG. 7 is a section view of the chemical preparation mixer of FIG. 2.

FIG. 7 illustrates the arrangement of the different systems and components of a non-limiting embodiment of the chemical preparation mixer 10 which has all of the components contained within the main housing 24. While this embodiment shows the components in a specific arrangement, other embodiments may alter this arrangement in a variety of ways without detracting from the function and purpose of the chemical preparation mixer 10. Therefore, the embodiment and arrangement shown is provided for illustrative purposes only and does not imply any limitation on other embodiments of the chemical preparation mixer 10. In the embodiment shown in FIG. 7, the weighing system 14 is at the top of the main housing 24, with the weighing surface 30 being the top surface 31 of the chemical preparation mixer 10. The heating system 16 and the mixing system 18 are located near the bottom of the main housing 24.

Figures 8, 9, 10:
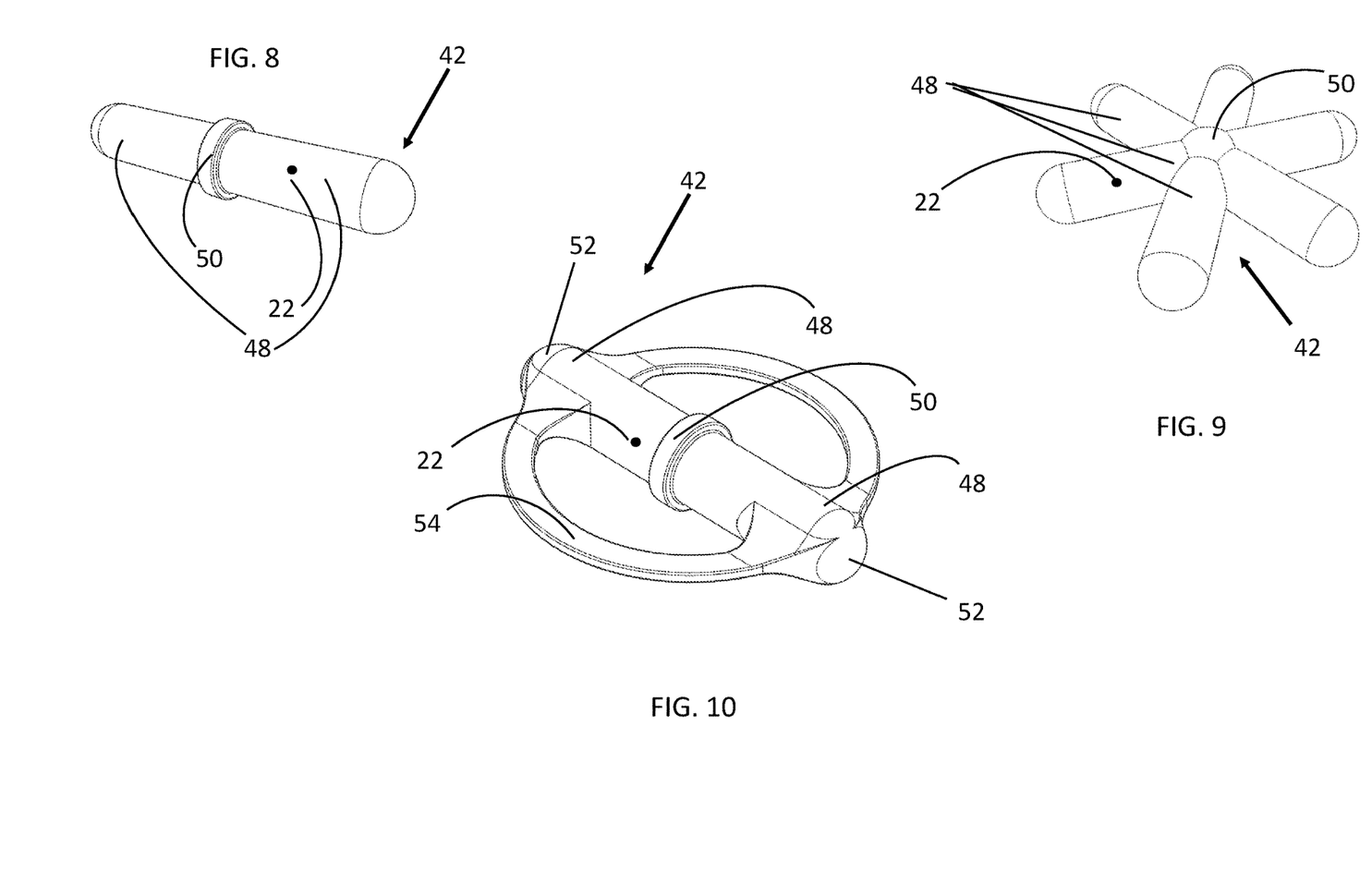
FIG. 8 is a perspective view of a capsule stirrer.
FIG. 9 is a perspective view of an arm stirrer.
FIG. 10 is a perspective view of a ring stirrer.

FIGS. 8 through 10 illustrate various embodiments of the stirrer 42. In the embodiments shown, there may be a magnet in each of the arms 48 which allows the stirrer 42 to magnetically couple with the driver 40. When the magnets 46 or the magnetic field produced by the magnetic driver 40 travel in a circle, the stirrer 42 also rotates because the magnets in the arms 48 attract the stirrer to the magnets 46 or the magnetic field produced by the magnetic driver 40. FIGS. 8 and 9 illustrate a stirrer 42 which has a central hub 50 and multiple arms 48 which extend radially away from the central hub 50. FIG. 10 illustrates an embodiment similar to FIGS. 8 and 9, but with a ring 54 that surrounds both the central hub 50 and the arms 48, and that is integral with the ends 52 of each of the arms 48.

FIGS. 2 and 11-12E show an example of a decarboxylation canister 60. A decarboxylation canister 60 may comprise a sleeve 62, a canister 64 nested within the sleeve 62, a basket 66 positioned within the canister 64, and a pan 68, a filter 70 and a lid 72 covering the decarboxylation canister 60. FIG. 12A illustrates an exploded view of the decarboxylation canister 60. FIG. 12B shows a front perspective view of the decarboxylation canister 60. FIG. 12C shows a rear perspective view. FIG. 12D shows a side view and 12E is a cross-sectional view taken along section lines B-B of FIG. 12D. Use of the decarboxylation canister 60 is described previously herein.

It will be understood that implementations are not limited to the specific components disclosed herein, as virtually any components consistent with the intended operation of a method and/or system implementation for a chemical preparation mixer may be utilized. Accordingly, for example, it should be understood that, while the drawings and accompanying text show and describe particular chemical preparation mixer implementations, any such implementation may comprise any shape, size, style, type, model, version, class, grade, measurement, concentration, material, weight, quantity, and/or the like consistent with the intended operation of a method and/or system implementation for a chemical preparation mixer.

The concepts disclosed herein are not limited to the specific implementations shown herein. For example, it is specifically contemplated that the components included in a particular implementation of a chemical preparation mixer may be formed of any of many different types of materials or combinations that can readily be formed into shaped objects and that are consistent with the intended operation of a chemical preparation mixer. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing.

Furthermore, embodiments of the chemical preparation mixer may be manufactured separately and then assembled together, or any or all of the components may be manufactured simultaneously and integrally joined with one another. Manufacture of these components separately or simultaneously, as understood by those of ordinary skill in the art, may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like, depending on, among other considerations, the particular material(s) forming the components.

In places where the description above refers to particular implementations of a chemical preparation mixer, it should be readily apparent that a number of modifications may be made without departing from the spirit thereof and that these implementations may be applied to other chemical preparation mixers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning and range of equivalency of the claims are intended to be embraced therein.

What is claimed is:

1. A *cannabis* preparation mixer, comprising:
a processor, electrically coupled with each of a weighing system, a heating system, a mixing system, and a user interface, the processor configured to:
  receive 1) an indication of a volume quantity of ingredients to be cooked by the heating system through the user interface, 2) an indication of a weight quantity of *cannabis* being weighed on the weighing system to be added to the volume quantity of ingredients, and 3) an indication from a user of a potency of the *cannabis* being weighed on the weighing system through the user interface;
  display in real time to the user through the user interface a maximum THC concentration for a final solution comprising the volume quantity of ingredients and the weight quantity of *cannabis* if the volume quantity and the weight quantity are combined and cooked; and
  transmit operational instructions to the heating system and the mixing system to heat and mix a mixture according to a predetermined pattern selected based upon at least the volume quantity and the weight quantity to maintain a desired temperature, mixing speed, and cook time for the maximum THC concentration displayed;
  wherein the weighing system is coupled to and exposed on a main housing, the weighing system comprising a scale plate and a scale sensor, wherein the scale plate sits on top of the scale sensor and provides a weighing surface which is substantially horizontal;
  wherein the heating system is coupled to and exposed on the main housing and comprises a heating element, a heat plate, and an insulation pad, wherein the heat plate sits on top of the heating element which sits on top of the insulation pad, the heat plate providing a heating surface which is substantially horizontal;
  wherein the *cannabis* preparation mixer further comprises a decarboxylation canister comprising a sleeve, a canister nested within the sleeve, a basket positioned within the canister, and a lid covering the decarboxylation canister, wherein the decarboxylation canister is configured to cause *cannabis* to go through decarboxylation when heated on the heating system;
  wherein the mixing system comprises a magnetic motor configured to magnetically couple a magnetic stirrer with a magnetic driver to cause the magnetic stirrer to rotate above the driver, the magnetic stirrer having a wireless temperature probe therein; and
  wherein the user interface is configured to communicatively couple with the processor and configured to receive input from a user to identify user preferences and settings.

2. The *cannabis* preparation mixer of claim 1, wherein the weighing system is exposed on a top surface of the main housing.

3. The *cannabis* preparation mixer of claim 1, wherein the magnetic driver is a coil array and the magnetic stirrer is positioned above the coil array and formed as a disk comprising a plurality of positively charged and negatively charged features alternately spaced around a center of the disk, the positively charged and negatively charged features magnetically responsive to the coil array to cause the magnetic stirrer to rotate.

4. The *cannabis* preparation mixer of claim 1, further comprising the magnetic stirrer formed as a central hub with at least two arms that extend out radially from the central hub.

5. The *cannabis* preparation mixer of claim 1, wherein at least a portion of each of the weighing system, heating system, mixing system, and user interface are contained within the main housing.

6. A chemical preparation mixer, comprising:
a processor, electrically coupled with each of a weighing system, a heating system, a mixing system, and a user interface, the processor configured to:
  receive 1) an indication of a volume quantity of ingredients to be cooked by the heating system through the user interface, 2) an indication of a weight quantity of

*cannabis* being weighed on the weighing system to be added to the volume quantity of ingredients, and 3) an indication from a user of a potency of the *cannabis* being weighed on the weighing system through the user interface;

display in real time to the user through the user interface a maximum THC concentration for a final solution comprising the volume quantity of ingredients and the weight quantity of *cannabis* if the volume quantity and the weight quantity are combined and cooked; and transmit operational instructions to the heating system and the mixing system to heat and mix a mixture according to a predetermined pattern selected by a user based upon at least the volume quantity and the weight quantity to maintain a desired temperature, mixing speed, and cook time for the maximum THC concentration displayed;

wherein the weighing system is coupled to and exposed on a main housing, the weighing system comprising a scale plate and a scale sensor, wherein the scale plate sits on top of the scale sensor;

wherein the heating system is coupled to and exposed on the main housing and comprises a heating element and a heat plate, wherein the heat plate sits on top of the heating element, the heat plate providing a heating surface which is substantially horizontal;

wherein the mixing system comprises a driver configured to magnetically couple with a magnetic stirrer to cause the magnetic stirrer to rotate above the driver, the magnetic stirrer having a wireless temperature probe;

wherein the user interface is configured to communicatively couple with the processor and configured to receive input from the user to identify user preferences and settings; and wherein at least a portion of each of the weighing system, heating system, mixing system, and user interface are contained within the main housing.

7. The chemical preparation mixer of claim 6, wherein the driver is a magnetic coil array and the magnetic stirrer is positioned above the coil array and formed as a disk comprising a plurality of positively charged and negatively charged features alternately spaced around a center of the disk, the positively charged and negatively charged features magnetically responsive to the coil array to cause the magnetic stirrer to rotate.

8. The chemical preparation mixer of claim 6, further comprising the magnetic stirrer formed as a central hub with at least two arms that extend out radially from the central hub.

9. The chemical preparation mixer of claim 6, wherein the predetermined pattern is selected based upon a weight of herbs sensed at the weighing system.

10. The chemical preparation mixer of claim 6, wherein the weighing system is adjacent to the heating system.

11. The chemical preparation mixer of claim 6, wherein the scale plate is formed as a bowl.

12. The chemical preparation mixer of claim 6, the mixing system further comprising a magnet holder coupled to the driver and to at least one magnet.

13. A chemical preparation mixer, comprising:
a processor, electrically coupled with each of a weighing system, a heating system, a mixing system, and a user interface, the processor configured to:
receive 1) an indication of a volume quantity of ingredients to be cooked by the heating system through the user interface, 2) an indication of a weight quantity of *cannabis* being weighed on the weighing system to be added to the volume quantity of ingredients, and 3) an indication from a user of a potency of the *cannabis* being weighed on the weighing system through the user interface;

display in real time to the user through the user interface a maximum THC concentration for a final solution comprising the volume quantity of ingredients and the weight quantity of *cannabis* if the volume quantity and the weight quantity are combined and cooked; and transmit operational instructions to the heating system and the mixing system to heat and mix a mixture based upon at least the volume quantity and the weight quantity to maintain a desired temperature, mixing speed, and cook time for the maximum THC concentration displayed;

wherein the weighing system is coupled to and exposed on a main housing, the weighing system comprising a scale plate and a scale sensor, wherein the scale plate sits on top of the scale sensor;

wherein the heating system is coupled to and exposed on the main housing and comprises a heating element, wherein the heating element provides a heating surface which is substantially horizontal;

wherein the mixing system comprises a driver configured to couple with a stirrer to cause the stirrer to rotate; and wherein the user interface is configured to communicatively couple with the processor and configured to receive input from a user to identify user preferences and settings.

14. The chemical preparation mixer of claim 13, wherein the driver further comprises a coil array and the chemical preparation mixer further comprising the stirrer magnetically coupled to the coil array.

15. The chemical preparation mixer of claim 14, further comprising the stirrer formed as a central hub with at least two arms that extend out radially from the central hub.

16. The chemical preparation mixer of claim 15, wherein the stirrer comprises a ring encircling the stirrer and an end of each of the arms is integral with the ring.

17. The chemical preparation mixer of claim 13, wherein the processor is configured to send instructions to the mixer according to a predetermined pattern selected based upon a weight of herbs sensed at the weighing system.

18. The chemical preparation mixer of claim 13, wherein the scale plate is formed as a bowl.

19. The chemical preparation mixer of claim 13, further comprising the stirrer with a temperature probe therein, wirelessly coupled to the processor.

20. The chemical preparation mixer of claim 13, wherein the driver is configured as a magnetic coil array, and wherein the stirrer is a magnetic stirrer positioned above the coil array and formed as a disk comprising a plurality of positively charged and negatively charged features alternately spaced around a center of the disk, the positively charged and negatively charged features magnetically responsive to changes in polarity of the coil array to cause the magnetic stirrer to rotate.

* * * * *